(12) United States Patent
Hashimoto et al.

(10) Patent No.: US 10,961,932 B2
(45) Date of Patent: Mar. 30, 2021

(54) INTERNAL COMBUSTION ENGINE CONTROL DEVICE, INTERNAL COMBUSTION ENGINE CONTROL METHOD, AND VEHICLE

(71) Applicant: HONDA MOTOR CO., LTD., Tokyo (JP)

(72) Inventors: Eiji Hashimoto, Wako (JP); Naoki Fukuoka, Wako (JP); Masayuki Yoshiiri, Wako (JP); Kengo Takada, Wako (JP); Mitsuo Hashizume, Wako (JP)

(73) Assignee: Honda Motor Co., Ltd., Tokyo (JP)

(*) Notice: Subject to any disclaimer, the term of this patent is extended or adjusted under 35 U.S.C. 154(b) by 0 days.

(21) Appl. No.: 16/591,914

(22) Filed: Oct. 3, 2019

(65) Prior Publication Data
US 2020/0109680 A1    Apr. 9, 2020

(30) Foreign Application Priority Data
Oct. 4, 2018 (JP) .............................. JP2018-189054

(51) Int. Cl.
*F02D 41/14* (2006.01)
*F02D 41/34* (2006.01)
*F02D 41/40* (2006.01)

(52) U.S. Cl.
CPC ......... *F02D 41/1466* (2013.01); *F02D 41/34* (2013.01); *F02D 41/402* (2013.01)

(58) Field of Classification Search
CPC ...... F02D 41/00; F02D 41/14; F02D 41/1466; F02D 41/40; F02D 41/402; F02D 41/34; F02D 45/00; B60W 10/00; B60K 6/20
(Continued)

(56) References Cited

U.S. PATENT DOCUMENTS 7,089,908 B2 * 8/2006 Fujieda .................... F01L 1/34
                                             123/299
7,234,440 B2 * 6/2007 Hilditch .............. F02D 41/0255
                                             123/299
(Continued)

FOREIGN PATENT DOCUMENTS

JP          3758003 B2      3/2006
JP       2008-196318 A      8/2008
(Continued)

OTHER PUBLICATIONS

Office Action dated Mar. 3, 2020 issued over the corresponding Japanese Patent Application No. 2018-189054 with the English translation thereof.

*Primary Examiner* — John Kwon
*Assistant Examiner* — Johnny H Hoang
(74) *Attorney, Agent, or Firm* — Carrier Blackman & Associates, P.C.; William D. Blackman; Joseph P. Carrier

(57) ABSTRACT

An internal combustion engine control device includes a combustion degree of stoppage determination unit which determines whether stoppage of combustion of an internal combustion engine has reached a threshold degree, and an internal combustion engine control unit which performs a normal control in the case that the combustion of the engine is resumed in a state where stoppage of combustion has not reached the threshold degree, and performs a soot suppression control in the case that the engine combustion is resumed in a state where stoppage of combustion has reached the threshold degree. In the soot suppression control, the split injection or the single injection is carried out within the predetermined stroke, and the engine control unit causes a fuel injection timing in the single injection of the soot suppression control to be delayed with respect to the (Continued)

fuel injection timing in the single injection of the normal control.

8 Claims, 6 Drawing Sheets

(58) Field of Classification Search
USPC .... 701/101–105, 114; 123/198 DB, 198 DC, 123/198 F
See application file for complete search history.

(56) References Cited

U.S. PATENT DOCUMENTS

| | | | |
|---|---|---|---|
| 8,851,050 B2* | 10/2014 | Shishime | F02D 13/0238 123/406.29 |
| 2008/0140300 A1* | 6/2008 | Kuo | F02D 41/3041 701/113 |
| 2008/0208437 A1* | 8/2008 | Natsui | F02D 41/20 701/104 |
| 2009/0088945 A1* | 4/2009 | Yi | F02D 41/401 701/103 |
| 2016/0115878 A1* | 4/2016 | VanDerWege | F02D 17/02 123/333 |

FOREIGN PATENT DOCUMENTS

| | | |
|---|---|---|
| JP | 2009-162141 A | 7/2009 |
| JP | 2009-264226 A | 11/2009 |

\* cited by examiner

INTERNAL COMBUSTION ENGINE CONTROL DEVICE, INTERNAL COMBUSTION ENGINE CONTROL METHOD, AND VEHICLE

CROSS-REFERENCE TO RELATED APPLICATION

This application is based upon and claims the benefit of priority from Japanese Patent Application No. 2018-189054 filed on Oct. 4, 2018, the contents of which are incorporated herein by reference.

BACKGROUND OF THE INVENTION

Field of the Invention

The present invention relates to an internal combustion engine control device, an internal combustion engine control method, and a vehicle.

Description of the Related Art

An engine that directly injects gasoline as a fuel into cylinders at high pressure, that is, a gasoline direct injection engine, has been proposed. Such a gasoline direct injection engine is attracting significant attention because of its ability to improve fuel efficiency.

In Japanese Patent No. 3758003, a cylinder injection type spark ignition internal combustion engine is disclosed in which, in the case that a temperature detected by a temperature detecting unit configured to detect the temperature of the internal combustion engine is less than a predetermined value, an intake stroke injection mode is selected, and the fuel is injected in a plurality of batches in the intake stroke. By dividing and injecting the fuel a plurality of times, it is possible to suppress the generation of soot, even in the case that the temperature in the combustion chamber is low.

SUMMARY OF THE INVENTION

However, the technique described in Japanese Patent No. 3758003 may not be capable of suppressing the generation of soot.

An object of the present invention is to provide an internal combustion engine control device, an internal combustion engine control method, and a vehicle which are capable of more reliably suppressing the generation of soot.

An internal combustion engine control device according to one aspect of the present invention is configured to control an internal combustion engine which is configured to selectively perform a single injection in which fuel is injected into a combustion chamber a single time within a predetermined stroke, and a split injection in which the fuel is injected into the combustion chamber a plurality of times within the predetermined stroke, the internal combustion engine control device including a combustion degree of stoppage determination unit configured to determine whether or not stoppage of combustion of the internal combustion engine has reached a threshold degree, and an internal combustion engine control unit configured to perform a normal control in the case that the combustion of the internal combustion engine is resumed in a state in which the stoppage of combustion has not reached the threshold degree, and to perform a soot suppression control to suppress generation of soot in the case that the combustion of the internal combustion engine is resumed in a state in which the stoppage of combustion has reached the threshold degree, wherein, in the soot suppression control, the split injection or the single injection is carried out within the predetermined stroke, and the internal combustion engine control unit causes a fuel injection timing in the single injection of the soot suppression control to be delayed with respect to the fuel injection timing in the single injection of the normal control.

A vehicle according to another aspect of the present invention includes the internal combustion engine control device as described above.

An internal combustion engine control method according to still another aspect of the present invention controls an internal combustion engine which is configured to selectively perform a single injection in which fuel is injected into a combustion chamber a single time within a predetermined stroke, and a split injection in which the fuel is injected into the combustion chamber a plurality of times within the predetermined stroke, the internal combustion engine control method including a step of determining whether or not stoppage of combustion of the internal combustion engine has reached a threshold degree, and a step of performing a normal control in the case that the combustion of the internal combustion engine is resumed in a state in which the stoppage of combustion has not reached the threshold degree, and performing a soot suppression control to suppress generation of soot in the case that the combustion of the internal combustion engine is resumed in a state in which the stoppage of combustion has reached the threshold degree, wherein, in the soot suppression control, the split injection or the single injection is carried out within the predetermined stroke, and a fuel injection timing in the single injection of the soot suppression control is delayed with respect to the fuel injection timing in the single injection of the normal control.

According to the present invention, an internal combustion engine control device, an internal combustion engine control method, and a vehicle can be provided which are capable of more reliably suppressing the generation of soot.

The above and other objects, features, and advantages of the present invention will become more apparent from the following description when taken in conjunction with the accompanying drawings, in which preferred embodiments of the present invention are shown by way of illustrative example.

DESCRIPTION OF THE PREFERRED EMBODIMENTS

Preferred embodiments of an internal combustion engine control device, an internal combustion engine control method, and a vehicle according to the present invention will be presented and described in detail below with reference to the accompanying drawings.

EMBODIMENTS

Figure 1:
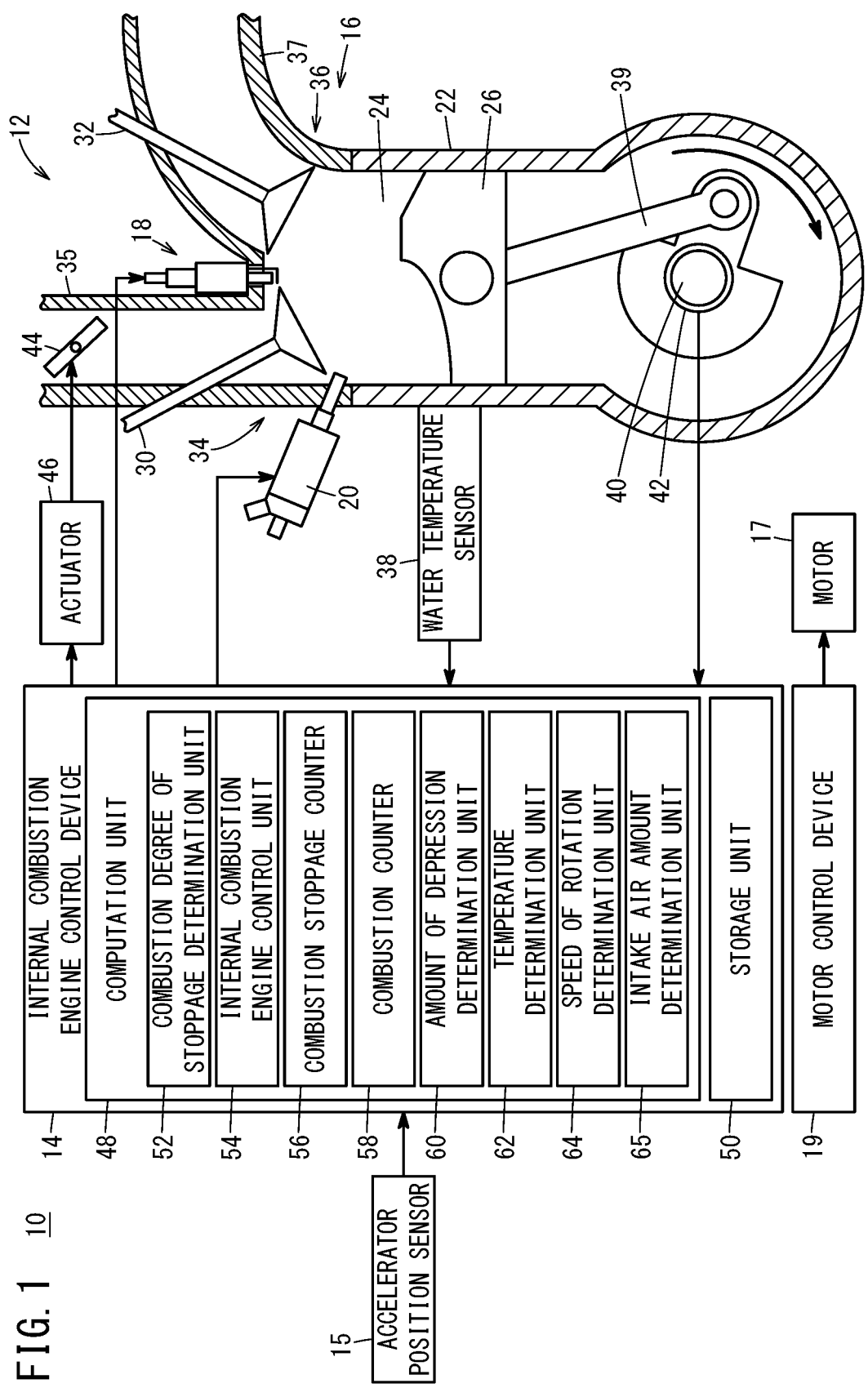
FIG. 1 is a block diagram showing a vehicle equipped with an internal combustion engine control device according to an embodiment of the present invention.

An internal combustion engine control device, an internal combustion engine control method, and a vehicle according to the embodiments will be presented and described with reference to the drawings. FIG. 1 is a block diagram showing a vehicle equipped with an internal combustion engine control device according to a present embodiment. As shown in FIG. 1, a vehicle 10 according to the present embodiment includes an internal combustion engine 12, an internal combustion engine control device 14, an accelerator position sensor 15, a motor 17, and a motor control device 19. It should be noted that, although the vehicle 10 is provided with constituent elements other than the constituent elements noted above, description of these elements has been omitted herein.

The internal combustion engine (vehicle drive source) 12, for example, is an engine, and more specifically, a gasoline direct injection engine that directly injects gasoline as a fuel at high pressure into a combustion chamber 24. Such an internal combustion engine 12 is also referred to as a cylinder injection type internal combustion engine. In this instance, a case will be described as an example in which the internal combustion engine 12 is an in-line 4-cylinder internal combustion engine, however, the present invention is not limited to such an engine.

A cylinder 22 and a cylinder head 16 are provided in the internal combustion engine 12. A piston 26, which is configured in a manner so as to reciprocate inside the cylinder 22, is further provided in the internal combustion engine 12. An ignition device (ignition plug, spark plug) 18, and a fuel injection device (fuel injector) 20 are provided in the cylinder head 16. The ignition device 18 and the fuel injection device 20 are provided in each of the four cylinders. Since the fuel injection device 20 is attached obliquely with respect to the cylinder 22, the fuel injection device 20 is capable of directly injecting fuel into the combustion chamber 24.

An intake port 34 and an exhaust port 36 are provided in the cylinder head 16. An intake valve 30 is disposed in the intake port 34. An exhaust valve 32 is disposed in the exhaust port 36. An intake pipe 35 is connected to the intake port 34. An exhaust pipe 37 is connected to the exhaust port 36. The intake pipe 35 is formed, for example, so as to extend in an upright direction, but is not necessarily limited to this configuration. The exhaust pipe 37 is formed, for example, so as to extend in a horizontal direction, but is not necessarily limited to this configuration. The intake valve 30 and the exhaust valve 32 can be driven by a non-illustrated valve operating mechanism. As such a valve operating mechanism, for example, a double overhead camshaft (DOHC) type of valve operating mechanism can be used. The intake valve 30 can be driven by a non-illustrated rotatably supported intake side camshaft. Further, the exhaust valve 32 can be driven by a non-illustrated rotatably supported exhaust side camshaft.

A water temperature sensor (temperature sensor) 38 that detects the temperature of cooling water that cools the combustion chamber 24 is further provided in the internal combustion engine 12. A connecting rod 39, a crankshaft 40, and a crank angle sensor 42 are further provided in the internal combustion engine 12. The connecting rod 39 transmits vertical motion of the piston 26 as rotational motion to the crankshaft 40. The crank angle sensor 42 outputs a crank angle signal at a predetermined crank position. The crank position can be determined on the basis of the signal output from the crank angle sensor 42. Further, the speed of rotation of the internal combustion engine 12 can also be determined on the basis of the signal output from the crank angle sensor 42.

There is further provided in the internal combustion engine 12 a throttle valve 44, and an actuator 46 that opens and closes the throttle valve 44. The throttle valve 44 is disposed in the intake pipe 35.

The vehicle 10 is capable of being driven not only by the internal combustion engine 12, but alternatively, the vehicle may be driven by the motor (vehicle drive source) 17. The motor 17 can be controlled by the motor control device 19. It will be understood that only one of the internal combustion engine 12 or the motor 17 is used at any given time. During times when the motor 17 is driving the vehicle 10, the internal combustion engine 12 is not being operated, and combustion within the internal combustion engine is stopped.

The internal combustion engine control device 14 is equipped with a computation unit 48 and a storage unit 50. The computation unit 48 can be constituted, for example, by a CPU (Central Processing Unit). The storage unit 50 comprises, for example, a non-illustrated non-volatile memory, and a non-illustrated volatile memory. The internal combustion engine 12 is controlled by controlling each of the units on the basis of programs that are stored in the storage unit 50.

The computation unit 48 comprises a combustion degree of stoppage determination unit 52, an internal combustion engine control unit 54, a combustion stoppage counter 56, a combustion counter 58, and an amount of depression determination unit 60. Further, the computation unit 48 comprises a temperature determination unit 62, a speed of rotation determination unit 64, and an intake air amount determination unit 65. The combustion degree of stoppage determination unit 52, the internal combustion engine control unit 54, the combustion stoppage counter 56, the combustion counter 58, and the amount of depression determination unit 60 can be realized by programs which are stored in the storage unit 50 being executed by the computation unit 48. Further, the temperature determination unit 62, the speed of rotation determination unit 64, and the intake air amount determination unit 65 can be realized by programs which are stored in the storage unit 50 being executed by the computation unit 48.

The combustion degree of stoppage determination unit (combustion stoppage time determination unit) 52 determines whether or not the stoppage of combustion of the internal combustion engine 12 has reached a predetermined threshold degree, or more specifically, whether or not a combustion stoppage time of the internal combustion engine 12 has reached a threshold time period THtime. As used herein, the term "stoppage of combustion" means a condition in which the internal combustion engine is turned off and is not operating A time period during which stoppage of combustion occurs is referred to herein as an engine shutoff time.

The internal combustion engine control unit 54 administers the control of the internal combustion engine 12. The internal combustion engine control unit 54 can selectively perform a single injection in which fuel is injected into the combustion chamber 24 a single time within a predetermined stroke, and a split injection in which the fuel is injected into the combustion chamber 24 a plurality of times within the predetermined stroke. In the split injection, for example, two injections of fuel are intermittently carried out within the predetermined stroke.

The internal combustion engine control unit 54 performs a normal control in the case that the combustion of the internal combustion engine 12 is resumed in a state in which the temperature of the cooling water is greater than or equal to a threshold temperature THtemp, and the stoppage of combustion has not reached the threshold degree. More specifically, the internal combustion engine control unit 54 performs the normal control in the case that the combustion of the internal combustion engine 12 is resumed in a state in which the temperature of the cooling water is greater than or equal to the threshold temperature THtemp, and the combustion stoppage time has not reached the threshold time period THtime. The normal control is a control for injecting the fuel at an optimal time in relation to combustion stability or fuel consumption. In the case that the combustion of the internal combustion engine 12 is resumed in a state in which the stoppage of combustion has reached the threshold degree, the internal combustion engine control unit 54 carries out a soot suppression control, which is a control to suppress the generation of soot. More specifically, in the case that the combustion of the internal combustion engine 12 is resumed in a state in which the combustion stoppage time has reached the threshold time period THtime, the internal combustion engine control unit 54 carries out the soot suppression control, which is a control to suppress the generation of soot. In the present embodiment, performance of the soot suppression control in the case that the combustion of the internal combustion engine 12 is resumed in the state in which the stoppage of combustion has reached the threshold degree is carried out for the following reasons. Namely, concerning the temperature of the cooling water detected by the water temperature sensor 38, the ability thereof to follow or conform with respect to changes in temperature inside the combustion chamber 24 is not particularly high. For this reason, in the case that the stoppage of combustion has reached the threshold degree, it is conceivable that the temperature in the combustion chamber 24 is decreasing significantly, in spite of the fact that the temperature of the cooling water detected by the water temperature sensor 38 is not decreasing very much. If a control similar to the case when the interior of the combustion chamber 24 is being heated, i.e., the normal control, is carried out in a state that the temperature inside the combustion chamber 24 is being decreased significantly, the amount of soot that is generated increases. Therefore, according to the present embodiment, in the case that the combustion of the internal combustion engine 12 is resumed in the state in which the stoppage of combustion has reached the threshold degree, the soot suppression control is carried out. On the other hand, in the case that the stoppage of combustion has not reached the threshold degree, because it is conceivable that the temperature in the combustion chamber 24 is not decreased very much, the normal control is carried out.

Figure 2:
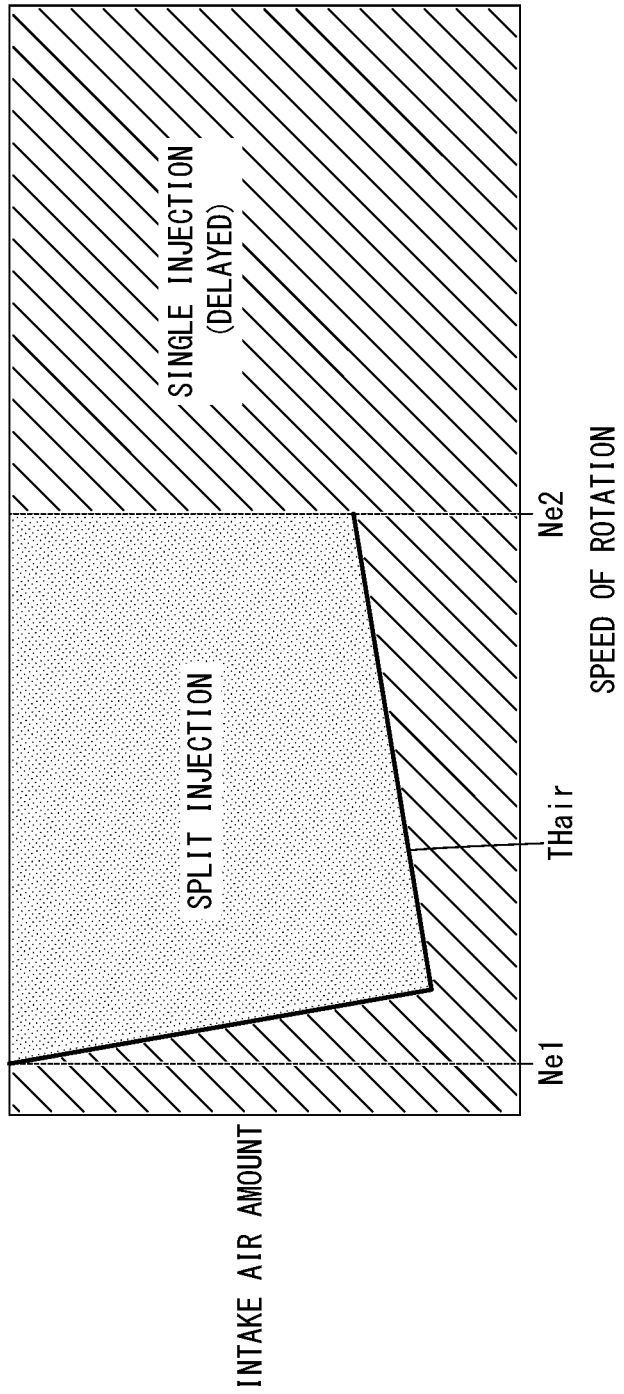
FIG. 2 is a graph showing an example of operations of the internal combustion engine control device according to the embodiment.

FIG. 2 is a graph showing an example of operations of the internal combustion engine control device according to the present embodiment. In FIG. 2, a range in which the split injection is performed, and a range in which the single injection is performed are shown. The horizontal axis in FIG. 2 is the speed of rotation of the internal combustion engine 12, and the vertical axis in FIG. 2 is the intake air amount, or in other words, the amount of air that is drawn into the combustion chamber 24 of the internal combustion engine 12.

In the case that the soot suppression control is performed in a state in which a predetermined condition is satisfied, the internal combustion engine control unit 54 performs a control in a manner so that the split injection is performed, for example, in the intake stroke. The predetermined condition is a condition in which the speed of rotation of the internal combustion engine 12 is greater than or equal to a first speed of rotation Ne1 and less than a second speed of rotation Ne2, and the amount of air that is drawn into the combustion chamber 24 is greater than or equal to a threshold amount of air THair corresponding to the speed of rotation of the internal combustion engine 12. The predetermined condition is a condition in which performance of the split injection is advisable. Accordingly, in the case that the soot suppression control is performed in a state in which the predetermined condition is not satisfied, the internal combustion engine control unit 54 performs a control in a manner so that the single injection is performed, for example, in the intake stroke. The fuel injection timing in the single injection of the soot suppression control is delayed with respect to the fuel injection timing in the single injection of the normal control.

Performance of the split injection is carried out for the following reasons. Namely, in the split injection, the amount of fuel that is injected at each time is small, and therefore, the fuel that is adhered to the inner wall of the cylinder 22 or the upper surface of the piston 26 is easily vaporized. If the fuel that is adhered to the inner wall of the cylinder 22 or the upper surface of the piston 26 is easily vaporized, it becomes difficult for soot to be generated. In accordance with such reasoning, the split injection is performed.

According to the present embodiment, as shown in FIG. 2, when the speed of rotation of the internal combustion engine 12 is greater than or equal to the second speed of rotation Ne2, the split injection is not performed. The reason why the split injection is not performed in the case that the speed of rotation of the internal combustion engine 12 is greater than or equal to the second speed of rotation Ne2 is as follows. Namely, if the split injection is performed in a state in which the speed of rotation of the internal combustion engine 12 is greater than or equal to the second speed of rotation Ne2, the timing of the second fuel injection is excessively delayed. If such a situation occurs, the fuel that is adhered to the inner wall of the cylinder 22 or the upper surface of the piston 26 is not fully vaporized, and generation of soot cannot be suppressed. Due to such reasoning, in the case that the speed of rotation of the internal combustion engine 12 is greater than or equal to the second speed of rotation Ne2, the split injection is not performed.

In the present embodiment, performance of the single injection in the soot injection control, in which the fuel injection timing becomes delayed more so than in the case of the normal control, is carried out for the following reasons. Namely, in the case that the single injection is performed in a manner so that the fuel injection timing is delayed more so than in the case of the normal control, the fuel is injected into the combustion chamber 24 in a state in which the distance between the nozzle jetting port of the fuel injection device 20 and the piston 26 is relatively large. When injected in this manner, the fuel that adheres to the upper surface of the piston 26 is reduced, and the fuel adhering to the upper surface of the piston 26 can be sufficiently vaporized. When the fuel adhering to the upper surface of the piston 26 is sufficiently vaporized, it becomes less likely for soot to be generated. Due to such reasoning, according to the present embodiment, the single injection is carried out in the soot injection control in which the fuel injection timing becomes delayed more so than in the case of the normal control.

The internal combustion engine control unit 54 performs the normal control in the case that the total amount of combustion of the internal combustion engine 12 has reached a predetermined degree in the soot suppression control after combustion of the internal combustion engine 12 is resumed. More specifically, in the case that the total combustion time of the internal combustion engine 12 in the soot suppression control after combustion of the internal combustion engine 12 is resumed has reached the predetermined time period Tpd, the internal combustion engine control unit 54 performs the normal control.

When stoppage of combustion of the internal combustion engine 12 is initiated, the combustion stoppage counter (combustion stoppage time timer) 56 begins counting the stoppage of combustion, and more specifically, begins counting the combustion stoppage time. When the stoppage of combustion of the internal combustion engine 12 is completed, the combustion stoppage counter 56 stops counting the stoppage of combustion, and returns the count value to zero.

The combustion counter (combustion time timer) 58 counts the total amount of combustion of the internal combustion engine 12, and more specifically, counts the total combustion time of the internal combustion engine in the soot suppression control after combustion of the internal combustion engine 12 is resumed. Stated otherwise, the combustion counter 58 counts the continuation of the soot suppression control. More specifically, the combustion counter 58 counts the duration of the soot suppression control.

On the basis of a signal output from the accelerator position sensor 15, the amount of depression determination unit 60 determines the amount that a non-illustrated accelerator pedal has been depressed.

On the basis of a signal output from the water temperature sensor 38, the temperature determination unit 62 determines whether or not the temperature of the cooling water is greater than or equal to the threshold temperature THtemp.

On the basis of a signal output from the crank angle sensor 42, the speed of rotation determination unit 64 determines the speed of rotation of the internal combustion engine 12.

On the basis of the amount of depression of the accelerator pedal as determined by the amount of depression determination unit 60, or the like, the intake air amount determination unit 65 determines the intake air amount.

Figure 3:
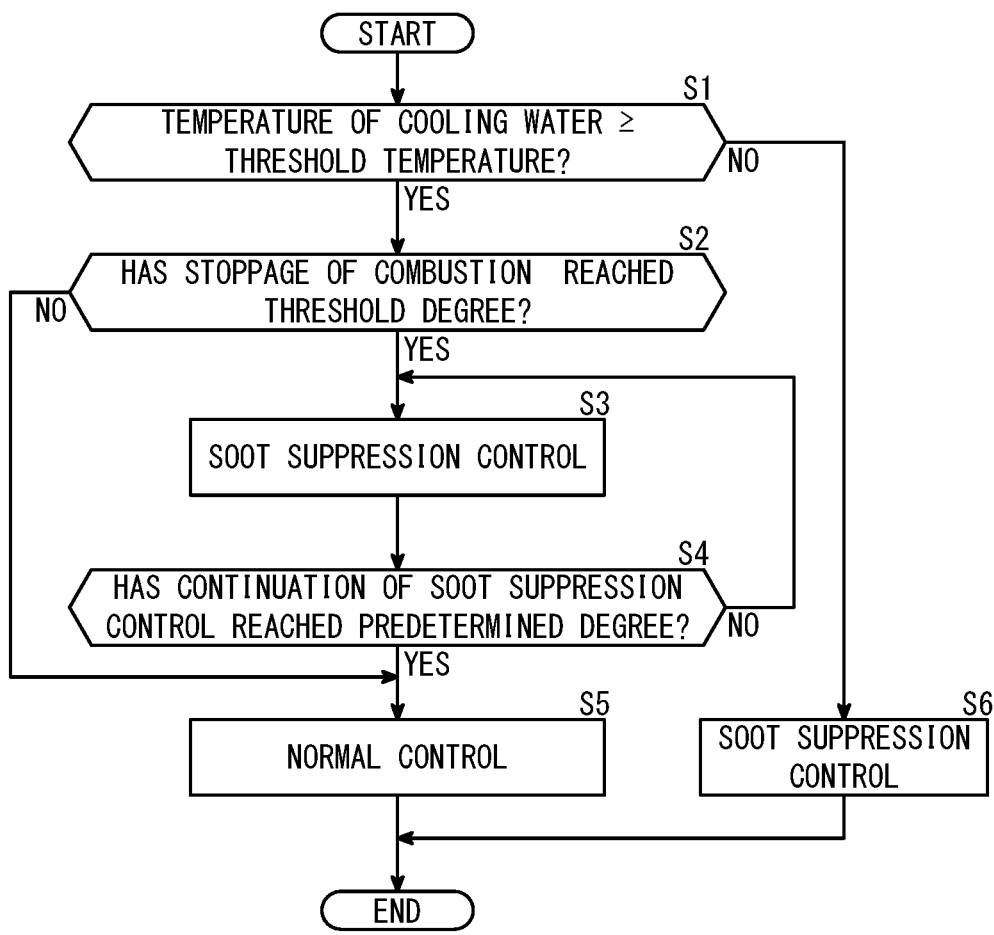
FIG. 3 is a flowchart showing operations of the internal combustion engine control device according to the embodiment.

FIG. 3 is a flowchart showing operations of the internal combustion engine control device according to the present embodiment. In FIG. 3, a control is shown that is carried out when combustion of the internal combustion engine 12 is resumed.

In step S1, the temperature determination unit 62 determines whether or not the temperature of the cooling water detected by the water temperature sensor 38 is greater than or equal to the threshold temperature THtemp (i.e., whether or not the temperature of cooling water the threshold temperature). In the case that the temperature of the cooling water is greater than or equal to the threshold temperature THtemp (YES in step S1), the process transitions to step S2. In the case that the temperature of the cooling water is less than the threshold temperature THtemp (NO in step S1), the process transitions to step S6.

In step S2, the combustion degree of stoppage determination unit 52 determines whether or not the stoppage of combustion of the internal combustion engine 12 has reached the predetermined threshold degree, or more specifically, whether or not the combustion stoppage time of the internal combustion engine 12 has reached the threshold time period THtime. In the case that the stoppage of combustion of the internal combustion engine 12 has reached the threshold degree (YES in step S2), the process transitions to step S3. In the case that the stoppage of combustion of the internal combustion engine 12 has not reached the threshold degree (NO in step S2), the process transitions to step S5.

In step S3, the internal combustion engine control unit 54 performs the soot suppression control. The process carried out in step S3 will be described later with reference to FIG. 4. Thereafter, the process transitions to step S4.

In step S4, the internal combustion engine control unit 54 determines whether or not the total amount of combustion of the internal combustion engine 12 in the soot suppression control after combustion of the internal combustion engine 12 is resumed has reached a predetermined degree. More specifically, the internal combustion engine control unit 54 determines whether or not the total combustion time of the internal combustion engine 12 in the soot suppression control after combustion of the internal combustion engine 12 is resumed has reached the predetermined time period Tpd. Stated otherwise, the internal combustion engine control unit 54 determines whether or not the continuation of the soot suppression control has reached a predetermined level, and more specifically, whether or not the duration time of the soot suppression control has reached the predetermined time period Tpd. Moreover, the total amount of combustion of the internal combustion engine 12 in the soot suppression control after combustion of the internal combustion engine 12 is resumed can be counted by the combustion counter 58. More specifically, the continuation of the soot suppression control can be counted by the combustion counter 58. In the case that the continuation of the soot suppression control has not reached a predetermined degree (NO in step S4), the soot suppression control (step S3) is repeated. In the case that the continuation of the soot suppression control has reached the predetermined degree (YES in step S4), the process transitions to step S5.

In step S5, the internal combustion engine control unit 54 performs the normal control. In step S5, the timing at which the fuel is injected by the fuel injection device 20 is controlled based on a second injection timing map. The second injection timing map is an injection timing map for the single injection, which is used when the normal control is performed in a state in which the cooling water is at a high temperature.

In step S6, the internal combustion engine control unit 54 performs the soot suppression control. The process carried out in step S6 will be described later with reference to FIG. 4.

Upon completion of the foregoing steps, the process shown in FIG. 3 is brought to an end.

Figure 4:
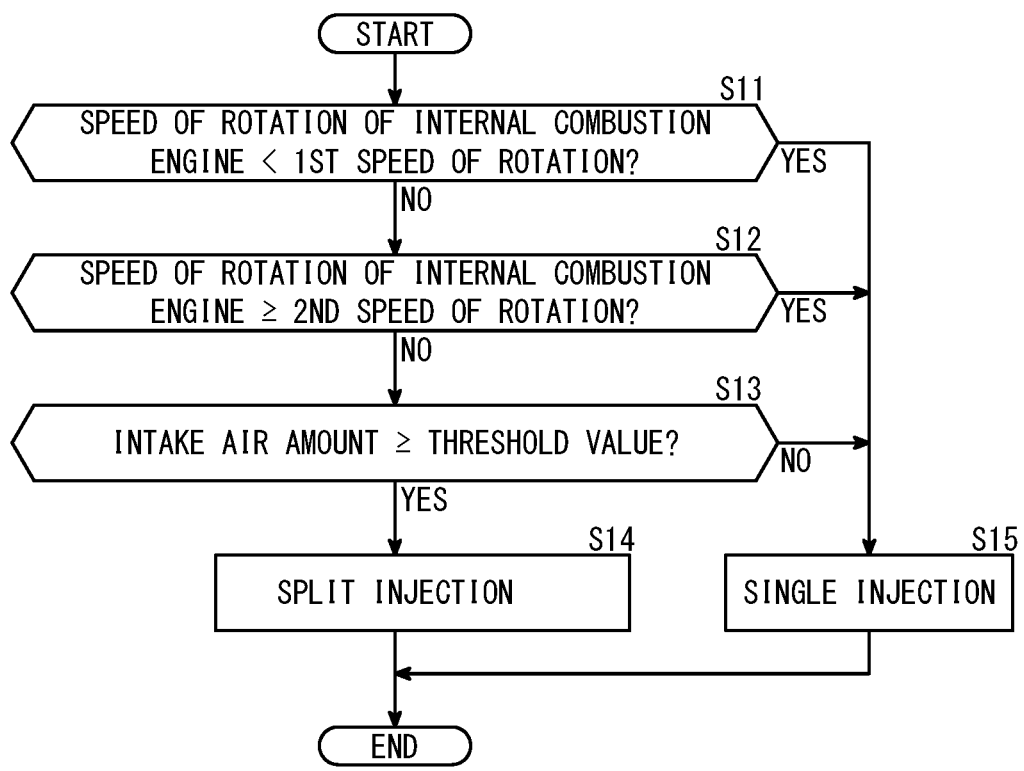
FIG. 4 is a flowchart showing operations of the internal combustion engine control device according to the embodiment.

FIG. 4 is a flowchart showing operations of the internal combustion engine control device according to the present embodiment. FIG. 4 shows operations preformed in the soot suppression control. The process steps shown in FIG. 4 are executed in steps S3 and S6 of FIG. 3.

In step S11, the internal combustion engine control unit 54 determines whether or not the speed of rotation of the internal combustion engine 12 is less than the first speed of rotation (i.e., whether or not the speed of rotation of internal combustion engine<the 1st speed of rotation). The speed of rotation of the internal combustion engine 12, as described above, is determined by the speed of rotation determination unit 64. In the case that the speed of rotation of the internal combustion engine 12 is less than the first speed of rotation (YES in step S11), the process transitions to step S15. In the case that the speed of rotation of the internal combustion engine 12 is greater than or equal to the first speed of rotation (NO in step S11), the process transitions to step S12.

In step S12, the internal combustion engine control unit 54 determines whether or not the speed of rotation of the internal combustion engine 12 is greater than or equal to the second speed of rotation (i.e., whether or not the speed of rotation of internal combustion engine the 2nd speed of rotation). In the case that the speed of rotation of the internal combustion engine 12 is greater than or equal to the second speed of rotation (YES in step S12), the process transitions to step S15. In the case that the speed of rotation of the internal combustion engine 12 is less than the second speed of rotation (NO in step S12), the process transitions to step S13.

In step S13, the internal combustion engine control unit 54 determines whether or not the intake air amount is greater than or equal to the threshold amount of air THair (i.e., whether or not the intake air amount the threshold value). The intake air amount, as described above, can be determined by the intake air amount determination unit 65. The threshold amount of air THair is set in advance in accordance with the speed of rotation of the internal combustion engine 12. In the case that the intake air amount is less than the threshold amount of air THair (NO in step S13), the process transitions to step S15. In the case that the intake air amount is greater than or equal to the threshold amount of air THair (YES in step S13), the process transitions to step S14.

In step S14, the internal combustion engine control unit 54 performs a control in a manner so that the split injection is performed. In step S14, which is executed in step S3, the timing at which the fuel is injected by the fuel injection device 20 is controlled based on a fifth injection timing map. The fifth injection timing map is an injection timing map for the split injection, which is used when the soot suppression control is performed in a state in which the stoppage of combustion has reached the threshold degree. The fifth injection timing map has a close resemblance to the third injection timing map. The third injection timing map is an injection timing map for the split injection, which is used when the soot suppression control is performed in a state in which the cooling water is at a medium temperature or a low temperature. In step S14, which is executed in step S6, the timing at which the fuel is injected by the fuel injection device 20 is controlled based on the third injection timing map.

In step S15, the internal combustion engine control unit 54 performs a control in a manner so that the single injection is performed. In step S15, which is executed in step S3, the timing at which the fuel is injected by the fuel injection device 20 is controlled based on a fourth injection timing map. The fourth injection timing map is an injection timing map for the single injection, which is used when the soot suppression control is performed in a state in which the stoppage of combustion has reached the threshold degree. The fourth injection timing map has a close resemblance to the first injection timing map. The first injection timing map is an injection timing map for the single injection, which is used when the soot suppression control is performed in a state in which the cooling water is at a medium temperature or a low temperature. The fuel injection amount when the first injection timing map is used is greater than the fuel injection amount when the fourth injection timing map is used. Therefore, the injection timing in the first injection timing map is shifted slightly from the injection timing in the fourth injection timing map. For this reason, the first injection timing map and the fourth injection timing map are not identical, but closely resemble one another. In step S15, which is executed in step S6, the timing at which the fuel is injected by the fuel injection device 20 is controlled based on the first injection timing map.

Upon completion of the foregoing steps, the process shown in FIG. 4 is brought to an end.

Figure 5:
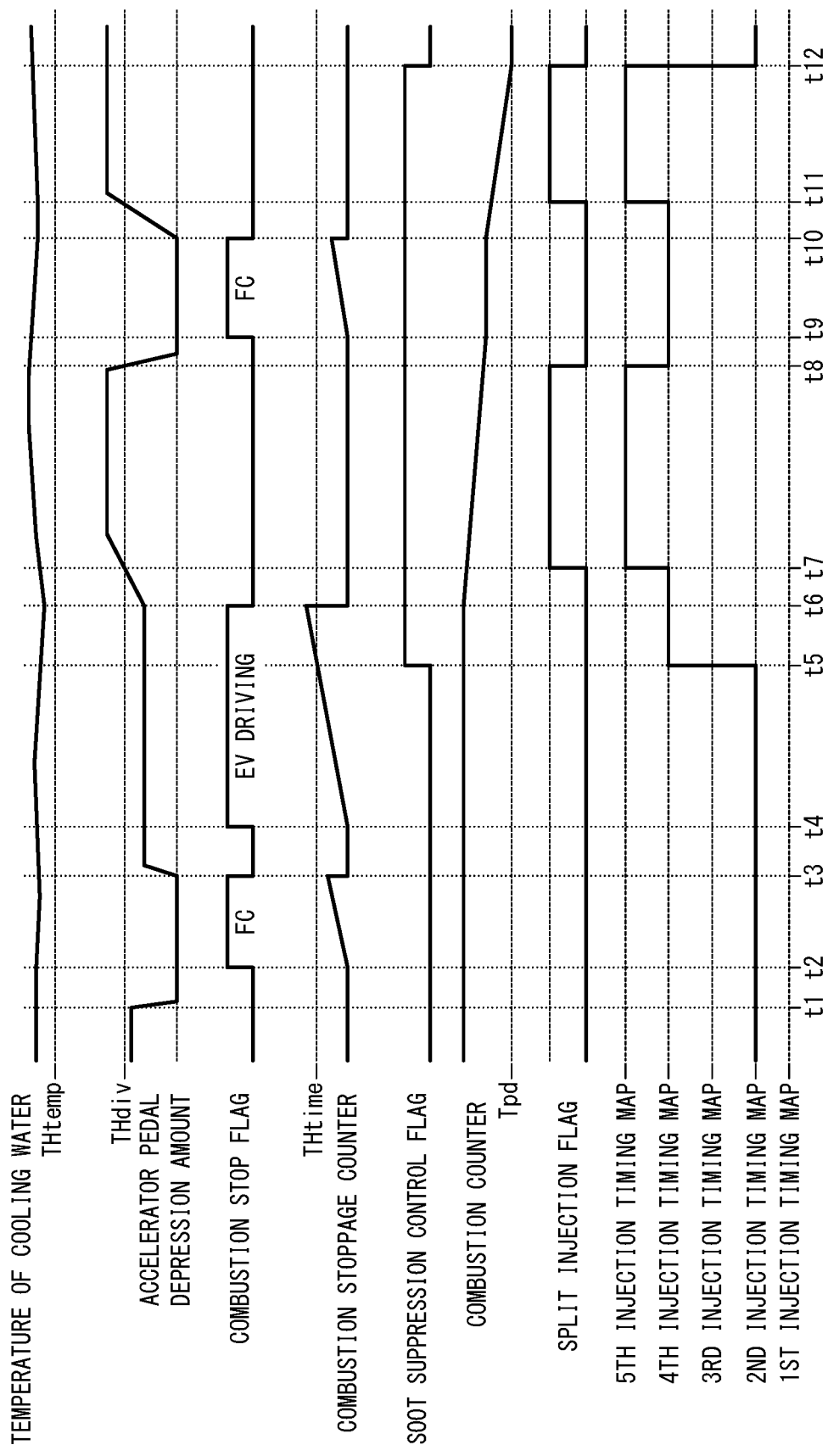
FIG. 5 is a time chart showing an example of operations of the internal combustion engine control device according to the embodiment.

FIG. 5 is a time chart showing an example of operations of the internal combustion engine control device according to the present embodiment. In FIG. 5, an example is shown in which the temperature of the cooling water is maintained to be greater than or equal to the threshold temperature THtemp.

The temperature of the cooling water is shown in FIG. 5. In FIG. 5, there is further shown the amount at which the accelerator pedal is depressed. Further, in FIG. 5, there is shown a combustion stop flag (combustion stop signal) indicating that combustion of the internal combustion engine 12 has been stopped. The combustion stop flag becomes an H level when the combustion of the internal combustion engine 12 is stopped. On the other hand, the combustion stop flag becomes an L level when the combustion of the internal combustion engine 12 is not stopped. Further, in FIG. 5, there is shown the count value counted by the combustion stoppage counter 56. Further, in FIG. 5, there is further shown a soot suppression control flag (soot suppression control signal). The soot suppression control flag transitions from the L level to the H level when the stoppage of combustion counted by the combustion stoppage counter 56 reaches the threshold degree. In the case that the internal combustion engine 12 is driven in a state with the soot suppression control flag being at the L level, the normal control is performed. In the case that the internal combustion engine 12 is driven in a state with the soot suppression control flag being at the H level, the soot suppression control is performed.

In FIG. 5, there is further shown the count value counted by the combustion counter 58. The total amount of combustion of the internal combustion engine 12 in the soot suppression control after combustion of the internal combustion engine 12 is resumed is counted by the combustion counter 58. More specifically, the total combustion time of the internal combustion engine 12 in the soot suppression control after combustion of the internal combustion engine 12 is resumed is counted by the combustion counter 58. The combustion counter 58 is a down counter, for example. When the total amount of combustion of the internal combustion engine 12 in the soot suppression control after combustion of the internal combustion engine 12 is resumed has reached the predetermined degree, the count value of the combustion counter 58 becomes zero. More specifically, when the total combustion time of the internal combustion engine 12 in the soot suppression control after combustion of the internal combustion engine 12 is resumed has reached the predetermined time period Tpd, the count value of the combustion counter 58 becomes zero. When the total amount of combustion of the internal combustion engine 12 in the soot suppression control after combustion of the internal combustion engine 12 is resumed reaches the predetermined degree, the soot suppression control flag transitions from the H level to the L level. In the case that the combustion of the internal combustion engine 12 is resumed in a state in which the total combustion of the internal combustion engine 12 in the soot suppression control after combustion of the internal combustion engine 12 is resumed does not reach the predetermined degree, the soot suppression control is performed. More specifically, the soot suppression control is performed in the case that the combustion of the internal combustion engine 12 is resumed in a state in which the count value of the combustion counter 58 has not reached zero.

Furthermore, in FIG. 5, there is shown a split injection flag (split injection signal) indicating whether or not to perform the split injection. In the case that a predetermined condition for performing the split injection is not satisfied, the split injection flag becomes the L level. In the case that the predetermined condition for performing the split injection is satisfied, the split injection flag becomes the H level. In the case that the internal combustion engine 12 is driven in a state with the split injection flag being at the L level, the single injection is performed. In the case that the internal combustion engine 12 is driven in a state with the split injection flag being at the H level, the split injection is performed.

In FIG. 5, there is further shown a signal indicating which one of the injection timing maps is used. As described above, the first injection timing map is an injection timing map for the single injection, which is used when the soot suppression control is performed in a state in which the cooling water is at a medium temperature or a low temperature. As described above, the second injection timing map is an injection timing map for the single injection, which is used when the normal control is performed in a state in which the cooling water is at a high temperature. As described above, the third injection timing map is an injection timing map for the split injection, which is used when the soot suppression control is performed in a state in which the cooling water is at a medium temperature or a low temperature. As described above, the fourth injection timing map is an injection timing map for the single injection, which is used when the soot suppression control is performed in a state in which the stoppage of combustion has reached the threshold degree. As described above, the fifth injection timing map is an injection timing map for the split injection, which is used when the soot suppression control is performed in a state in which the stoppage of combustion has reached the threshold degree.

At timing t1, the accelerator pedal is in a state of not being depressed by the user. Since the soot suppression control flag is at the L level, the temperature of the cooling water is greater than or equal to the threshold temperature THtemp, and the split injection flag is at the L level, the state in which the second injection timing map is selected is maintained. As described above, the second injection timing map is an injection timing map for the single injection, which is used when the normal control is performed in a state in which the cooling water is at a high temperature.

At timing t2, supply of fuel into the combustion chamber is stopped (FC: Fuel Cut), and the combustion stop flag becomes the H level. Since the stoppage of combustion of the internal combustion engine 12 is initiated, counting of the combustion, and more specifically, counting of the combustion stoppage time by the combustion stoppage counter 56 is started. Since the soot suppression control flag is at the L level, the temperature of the cooling water is greater than or equal to the threshold temperature THtemp, and the split injection flag is at the L level, the state in which the second injection timing map is selected is maintained.

At timing t3, the accelerator pedal is depressed by the user, the supply of fuel to the combustion chamber 24 is resumed, and the combustion stop flag becomes the L level. At timing t3, the count value by the combustion stoppage counter 56 does not reach the threshold value. More specifically, at timing t3, the time counted by the combustion stoppage counter 56 has not reached the threshold time period THtime. Therefore, the soot suppression control flag is maintained at the L level. Since the soot suppression control flag is at the L level, the temperature of the cooling water is greater than or equal to the threshold temperature THtemp, and the split injection flag is at the L level, the state in which the second injection timing map is selected is maintained.

At timing t4, driving of the vehicle 10 by the motor 17 is initiated, supply of fuel into the combustion chamber 24 is stopped, and the combustion stop flag becomes the H level. Since the stoppage of combustion of the internal combustion engine 12 is initiated, counting of the combustion stoppage, and more specifically, counting of the combustion stoppage time by the combustion stoppage counter 56 is started. Since the soot suppression control flag is at the L level, the temperature of the cooling water is greater than or equal to the threshold temperature THtemp, and the split injection flag is at the L level, the state in which the second injection timing map is selected is maintained.

At timing t5, the stoppage of combustion arrives at the threshold value, and more specifically, the combustion stoppage time reaches the threshold time period THtime, and the soot suppression control flag becomes the H level. Since the soot suppression control flag is at the H level, and the split injection flag is at the L level, the fourth injection timing map is selected. As described above, the fourth injection timing map is an injection timing map for the single injection, which is used when the soot suppression control is performed in a state in which the stoppage of combustion has reached the threshold degree.

At timing t6, the accelerator pedal is depressed by the user, the supply of fuel to the combustion chamber 24 is resumed, and the combustion stop flag becomes the L level. The count value counted by the combustion stoppage counter 56 is cleared. At timing t6, counting of the combustion, and more specifically, counting of the combustion time by the combustion counter 58 is initiated. Since the soot suppression control flag is at the H level, and the split injection flag is at the L level, the state in which the fourth injection timing map is selected is maintained.

At timing t7, the amount at which the accelerator pedal is depressed reaches a threshold amount of depression THdiv whereby the intake air amount becomes greater than or equal to the threshold amount of air THair, and the split injection flag becomes the H level. Since the soot suppression control flag is at the H level, and the split injection flag is at the H level, the fifth injection timing map is selected. As described above, the fifth injection timing map is an injection timing map for the split injection, which is used when the soot suppression control is performed in a state in which the stoppage of combustion has reached the threshold degree.

At timing t8, the accelerator pedal is in a state of not being depressed by the user. The amount at which the accelerator pedal is depressed becomes an amount of depression whereby the intake air amount is less than the threshold amount of air THair, and the split injection flag becomes the L level. Since the soot suppression control flag is at the H level, and the split injection flag is at the L level, the fourth injection timing map is selected. As described above, the fourth injection timing map is an injection timing map for the single injection, which is used when the soot suppression control is performed in a state in which the stoppage of combustion has reached the threshold degree.

At timing t9, supply of fuel into the combustion chamber 24 is stopped, and the combustion stop flag becomes the H level. Since the stoppage of combustion of the internal combustion engine 12 is initiated, counting of the combustion stoppage, and more specifically, counting of the combustion stoppage time by the combustion stoppage counter 56 is started. Since the supply of fuel into the combustion chamber 24 is stopped, counting of the combustion, and more specifically, counting of the combustion time by the combustion counter 58 is interrupted. Since the soot suppression control flag is at the H level, and the split injection flag is at the L level, the state in which the fourth injection timing map is selected is maintained.

At timing t10, the accelerator pedal is depressed by the user, the supply of fuel to the combustion chamber 24 is resumed, and the combustion stop flag becomes the L level. The stoppage of combustion, and more specifically, the combustion stoppage time counted by the combustion stoppage counter 56 is cleared. At timing t10, counting of the combustion, and more specifically, counting of the combustion time by the combustion counter 58 is initiated. Since the soot suppression control flag is at the H level, and the split injection flag is at the L level, the state in which the fourth injection timing map is selected is maintained.

At timing t11, the amount at which the accelerator pedal is depressed reaches a threshold amount of depression THdiv whereby the intake air amount becomes greater than or equal to the threshold value, and the split injection flag becomes the H level. Since the soot suppression control flag is at the H level, and the split injection flag is at the H level, the fifth injection timing map is selected. As described above, the fifth injection timing map is an injection timing map for the split injection, which is used when the soot suppression control is performed in a state in which the stoppage of combustion has reached the threshold degree.

At timing t12, the total amount of combustion of the internal combustion engine 12 in the soot suppression control after combustion of the internal combustion engine 12 is resumed arrives at the predetermined degree. More specifically, the total combustion time of the internal combustion engine 12 in the soot suppression control after combustion of the internal combustion engine 12 is resumed reaches the predetermined time period Tpd. Namely, the count value of the combustion counter 58 becomes zero. When the total amount of combustion of the internal combustion engine 12 in the soot suppression control after combustion of the internal combustion engine 12 is resumed reaches the predetermined degree, the soot suppression control flag transitions from the H level to the L level, and the split injection flag transitions from the H level to the L level. More specifically, when the total combustion time of the internal combustion engine 12 in the soot suppression control after combustion of the internal combustion engine 12 is resumed reaches the predetermined time period Tpd, the soot suppression control flag transitions from the H level to the L level, and the split injection flag transitions from the H level to the L level. Since the soot suppression control flag is at the L level, the temperature of the cooling water is greater than or equal to the threshold temperature THtemp, and the split injection flag is at the L level, the second injection timing map is selected. As described above, the second injection timing map is an injection timing map for the single injection, which is used when the normal control is performed in a state in which the cooling water is at a high temperature.

Figure 6:
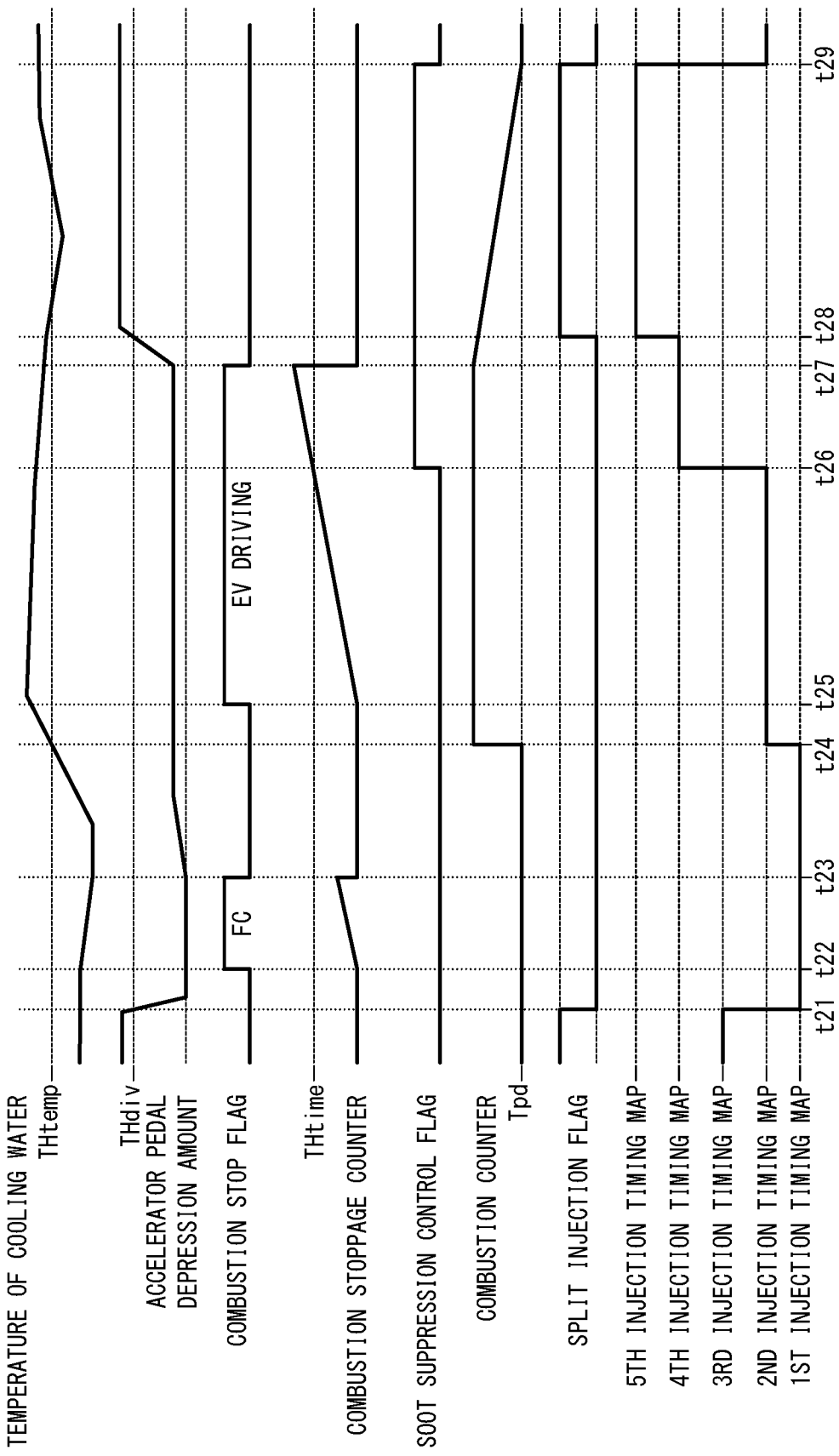
FIG. 6 is a time chart showing another example of operations of the internal combustion engine control device according to the embodiment.

FIG. 6 is a time chart showing another example of operations of the internal combustion engine control device according to the present embodiment. In FIG. 6, an example is shown in which the temperature of the cooling water changes from being less than the threshold temperature THtemp to being greater than or equal to the threshold temperature THtemp. In FIG. 6 as well, the same items as those in FIG. 5 are shown.

At timing t21, the accelerator pedal is in a state of not being depressed by the user. Consequently, the split injection flag transitions from the H level to the L level. Since the soot suppression control flag is at the L level, the temperature of the cooling water is less than the threshold temperature THtemp, and the split injection flag is at the L level, the first injection timing map is selected. As described above, the first injection timing map is an injection timing map for the single injection, which is used when the soot suppression control is performed in a state in which the cooling water is at a medium temperature or a low temperature.

At timing t22, the supply of fuel into the combustion chamber 24 is stopped, the combustion stop flag becomes the H level, and counting of the combustion stoppage, and more specifically, counting of the combustion stoppage time by the combustion stoppage counter 56 is started. Since the soot suppression control flag is at the L level, the temperature of the cooling water is less than the threshold temperature THtemp, and the split injection flag is at the L level, the state in which the first injection timing map is selected is maintained.

At timing t23, the accelerator pedal is depressed by the user, the supply of fuel to the combustion chamber 24 is resumed, and the combustion stop flag becomes the L level. At timing t23, the count value by the combustion stoppage counter 56 does not reach the threshold value. More specifically, at timing t23, the time counted by the combustion stoppage counter 56 has not reached the threshold time period THtime. Therefore, the soot suppression control flag is maintained at the L level. Since the soot suppression control flag is at the L level, the temperature of the cooling water is less than the threshold temperature THtemp, and the split injection flag is at the L level, the state in which the first injection timing map is selected is maintained.

At timing t24, the temperature of the cooling water reaches the threshold temperature THtemp. When the temperature of the cooling water arrives at the threshold temperature THtemp, the count value of the combustion counter 58 is set to a predetermined value. Since the soot suppression control flag is at the L level, the temperature of the cooling water is greater than or equal to the threshold temperature THtemp, and the split injection flag is at the L level, the second injection timing map is selected. As described above, the second injection timing map is an injection timing map for the single injection, which is used when the normal control is performed in a state in which the cooling water is at a high temperature.

At timing t25, driving of the vehicle 10 by the motor 17 is initiated, supply of fuel into the combustion chamber 24 is stopped, and the combustion stop flag becomes the H level. Since the stoppage of combustion of the internal combustion engine 12 is initiated, counting of the combustion stoppage, and more specifically, counting of the combustion stoppage time by the combustion stoppage counter 56 is started. Since the soot suppression control flag is at the L level, the temperature of the cooling water is greater than or equal to the threshold temperature THtemp, and the split injection flag is at the L level, the state in which the second injection timing map is selected is maintained.

At timing t26, the stoppage of combustion arrives at the threshold value, and more specifically, the combustion stoppage time reaches the threshold time period THtime, and the soot suppression control flag becomes the H level. The soot suppression control flag is a flag that is set only when the cooling water is at a high temperature, and the stoppage of combustion reaches the threshold value. Since the soot suppression control flag is at the H level, and the split injection flag is at the L level, the fourth injection timing map is selected. As described above, the fourth injection timing map is an injection timing map for the single injection, which is used when the soot suppression control is performed in a state in which the stoppage of combustion has reached the threshold degree.

At timing t27, the accelerator pedal is depressed by the user, the supply of fuel to the combustion chamber 24 is resumed, and the combustion stop flag becomes the L level. The count value counted by the combustion stoppage counter 56, and more specifically, the combustion stoppage time counted by the combustion stoppage counter 56 is cleared. At timing t27, counting of the combustion, and more specifically, counting of the combustion time by the combustion counter 58 is initiated. Since the soot suppression control flag is at the H level, and the split injection flag is at the L level, the state in which the fourth injection timing map is selected is maintained.

At timing t28, the amount at which the accelerator pedal is depressed reaches a threshold amount of depression THdiv whereby the intake air amount drawn into the combustion chamber 24 becomes greater than or equal to the threshold value, and the split injection flag becomes the H level. Since the soot suppression control flag is at the H level, and the split injection flag is at the H level, the fifth injection timing map is selected. As described above, the fifth injection timing map is an injection timing map for the split injection, which is used when the soot suppression control is performed in a state in which the stoppage of combustion has reached the threshold degree.

As shown in FIG. 6, at a stage prior to the count value of the combustion counter 58 becoming zero, the temperature of the cooling water may also become less than the threshold temperature THtemp. In such a case, the internal combustion engine control unit 54 continues the soot suppression control using the fifth injection timing map, without transitioning to the soot suppression control using the first injection timing map or the third injection timing map. Even if the temperature of the cooling water is greater than or equal to the threshold degree THtemp, the internal combustion engine control unit 54 continues the soot suppression control using the fifth injection timing map, without transitioning to the normal control using the second injection timing map.

At timing t29, the total amount of combustion of the internal combustion engine 12 in the soot suppression control after combustion of the internal combustion engine 12 is resumed arrives at the predetermined degree. More specifically, the total combustion time of the internal combustion engine 12 in the soot suppression control after combustion of the internal combustion engine 12 is resumed reaches the predetermined time period Tpd. Namely, the count value of the combustion counter 58 becomes zero. When the total amount of combustion of the internal combustion engine 12 in the soot suppression control after combustion of the internal combustion engine 12 is resumed reaches the predetermined degree, the soot suppression control flag transitions from the H level to the L level, and the split injection flag transitions from the H level to the L level. Since the soot suppression control flag is at the L level, the temperature of the cooling water is greater than or equal to the threshold temperature THtemp, and the split injection flag is at the L level, the second injection timing map is selected. As described above, the second injection timing map is an injection timing map for the single injection, which is used when the normal control is performed in a state in which the cooling water is at a high temperature.

In this manner, when combustion of the internal combustion engine 12 is resumed, it is determined which one to perform from among the normal control and the soot suppression control, on the basis of whether or not the stoppage of combustion has reached the threshold degree. Which one of the normal control and the soot suppression control is to be performed is determined based on the degree of stoppage of combustion, and therefore, the soot suppression control can be performed in an appropriate situation. Therefore, according to the present embodiment, it is possible to provide the internal combustion engine control device 14 which can more reliably suppress the generation of soot.

Modified Embodiments

Although preferred embodiments of the present invention have been described above, the present invention is not limited to the above-described embodiments, and various modifications can be made thereto without departing from the essence and scope of the present invention.

For example, in the above-described embodiments, although an exemplary case, and more specifically a case of direct fuel injection, has been described in which the fuel is directly injected into the combustion chamber 24, the present invention is not limited to this feature. The present invention can also be applied to a case in which the fuel is injected into the intake pipe 35.

Further, in the above-described embodiments, although an exemplary case has been described in which the combustion stoppage time is counted by the combustion stoppage counter 56, the present invention is not limited to this feature. For example, a number of operation cycles (number of mechanical operations) of the internal combustion engine 12 in a state in which combustion is stopped may be counted by the combustion stoppage counter 56. In this case, whether or not the number of operation cycles of the internal combustion engine 12 in the state in which combustion is stopped has reached a predetermined threshold number of cycles (threshold degree) is determined by the combustion degree of stoppage determination unit 52.

Further, in the above-described embodiments, although an exemplary case has been described in which the total combustion time of the internal combustion engine 12 in the soot suppression control after combustion of the internal combustion engine 12 is resumed is counted by the combustion counter 58, the present invention is not limited to this feature. For example, the number of operation cycles of the internal combustion engine 12 in the soot suppression control after combustion of the internal combustion engine 12 is resumed may be counted by the combustion counter 58. In this case, the internal combustion engine control unit 54 performs the normal control in the event that the total amount of number of operation cycles of the internal combustion engine 12 has reached a predetermined number of cycles (predetermined degree) in the soot suppression control after combustion of the internal combustion engine 12 is resumed. Further, the total fuel injection amount in the soot suppression control after combustion of the internal combustion engine 12 is resumed may be counted by the combustion counter 58. In this case, the internal combustion engine control unit 54 performs the normal control in the case that the total fuel injection amount has reached a predetermined fuel injection amount (predetermined degree) in the soot suppression control after combustion of the internal combustion engine 12 is resumed. Further, the total intake air amount in the soot suppression control after combustion of the internal combustion engine 12 is resumed may be counted by the combustion counter 58. In this case, the internal combustion engine control unit 54 performs the normal control in the case that the total intake air amount has reached a predetermined intake air amount (predetermined degree) in the soot suppression control after combustion of the internal combustion engine 12 is resumed.

The embodiments described above can be summarized in the following manner.

The internal combustion engine control device (14) controls the internal combustion engine (12) which is capable of selectively performing a single injection in which fuel is injected into the combustion chamber (24) a single time within a predetermined stroke, and a split injection in which the fuel is injected into the combustion chamber a plurality of times within the predetermined stroke, the internal combustion engine control device including the combustion degree of stoppage determination unit (52) configured to determine whether or not stoppage of combustion of the internal combustion engine has reached a threshold degree, and the internal combustion engine control unit (54) configured to perform a normal control in the case that the combustion of the internal combustion engine is resumed in a state in which the stoppage of combustion has not reached the threshold degree (THtime), and performs a soot suppression control to suppress generation of soot in the case that the combustion of the internal combustion engine is resumed in a state in which the stoppage of combustion has reached the threshold degree, wherein, in the soot suppression control, the split injection or the single injection is carried out within the predetermined stroke, and the internal combustion engine control unit causes a fuel injection timing in the single injection of the soot suppression control to be delayed with respect to the fuel injection timing in the single injection of the normal control. In accordance with such a configuration, when combustion of the internal combustion engine is resumed, it is determined which one to perform from among the normal control and the soot suppression control, on the basis of whether or not the stoppage of combustion has reached the threshold degree. Which one of the normal control and the soot suppression control is to be performed is determined based on the degree of stoppage of combustion, and therefore, the soot suppression control can be performed in an appropriate situation. For this reason, in accordance with such a configuration, generation of soot can be suppressed more reliably.

In the case that the soot suppression control is carried out in a state in which a predetermined condition is satisfied in which the speed of rotation of the internal combustion engine is greater than or equal to the first speed of rotation (Ne1) and less than the second speed of rotation (Ne2), and an amount of air that is drawn into the combustion chamber is greater than or equal to the threshold amount of air (THair) corresponding to the speed of rotation of the internal combustion engine, the internal combustion engine control unit may perform a control in a manner so that the split injection is carried out. In accordance with such a configuration, the split injection can be performed within a range in which performance of the split injection is advisable.

In the case that the soot suppression control is carried out in a state in which the predetermined condition is not satisfied, the internal combustion engine control unit may perform a control in a manner so that the single injection is performed. In accordance with such a configuration, the single injection can be performed within a range in which performance of the single injection is advisable.

The internal combustion engine control unit may perform the normal control in the case that the total amount of combustion of the internal combustion engine has reached the predetermined degree (Tpd) in the soot suppression control after combustion of the internal combustion engine is resumed.

The fuel may be directly injected into the combustion chamber of the internal combustion engine.

In the vehicle (10) that is equipped with the internal combustion engine, there may further be provided another vehicle drive source that differs from the internal combustion engine.

The vehicle includes the internal combustion engine control device as described above.

The internal combustion engine control method controls the internal combustion engine which is capable of selectively performing a single injection in which fuel is injected into a combustion chamber a single time within a predetermined stroke, and a split injection in which the fuel is injected into the combustion chamber a plurality of times within the predetermined stroke, the internal combustion engine control method including the step (step S2) of determining whether or not stoppage of combustion of the internal combustion engine has reached a threshold degree, and the step (step S3, step S5) of performing a normal control in the case that the combustion of the internal combustion engine is resumed in a state in which the stoppage of combustion has not reached the threshold degree, and performing a soot suppression control to suppress generation of soot in the case that the combustion of the internal combustion engine is resumed in a state in which the stoppage of combustion has reached the threshold degree, wherein, in the soot suppression control, the split injection or the single injection is carried out (step S14, step S15) within the predetermined stroke, and the fuel injection timing in the single injection of the soot suppression control is delayed with respect to the fuel injection timing in the single injection of the normal control.

What is claimed is:

1. In a vehicle having both an internal combustion engine and a drive motor, each of which can selectively act as a drive source for the vehicle, the improvement comprising an internal combustion engine control device configured to control the internal combustion engine,
   wherein the internal combustion engine is configured to selectively perform a single injection in which fuel is injected into a combustion chamber a single time within an intake stroke, and a split injection in which the fuel is injected into the combustion chamber a plurality of times within the intake stroke, the internal combustion engine control device comprising:
   a determination unit configured to determine whether or not an engine shutoff time, during which stoppage of combustion of the internal combustion engine occurs, has reached a threshold time period; and
   an internal combustion engine control unit configured to perform a first control in a case that the combustion of the internal combustion engine is resumed in a state in which the engine shutoff time has not reached the threshold time period, and to perform a second control, different from the first control, to suppress generation of soot in a case that the combustion of the internal combustion engine is resumed in a state in which the engine shutoff time has reached the threshold time period;

wherein, in the second control, the split injection or the single injection is carried out within the intake stroke; and the internal combustion engine control unit causes a fuel injection timing in the single injection of the second control to be delayed with respect to the fuel injection timing in the single injection of the first control.

2. The internal combustion engine control device according to claim 1, wherein, in a case that the second control is carried out in a state in which a predetermined condition is satisfied in which a speed of rotation of the internal combustion engine is greater than or equal to a first predetermined speed of rotation and less than a second predetermined speed of rotation, and an amount of air that is drawn into the combustion chamber is greater than or equal to a predetermined threshold amount of air corresponding to the speed of rotation of the internal combustion engine, the internal combustion engine control unit performs a control in a manner so that the split injection is carried out.

3. The internal combustion engine control device according to claim 2, wherein, in a case that the second control is carried out in a state in which the predetermined condition is not satisfied, the internal combustion engine control unit performs a control in a manner so that the single injection is performed.

4. The internal combustion engine control device according to claim 1, wherein the internal combustion engine control unit performs the first control in a case that a total amount of combustion of the internal combustion engine has reached a predetermined degree in the second control after combustion of the internal combustion engine is resumed.

5. The internal combustion engine control device according to claim 2, wherein the internal combustion engine control unit performs the first control in a case that a total amount of combustion of the internal combustion engine has reached a predetermined degree in the second control after combustion of the internal combustion engine is resumed.

6. The internal combustion engine control device according to claim 3, wherein the internal combustion engine control unit performs the first control in a case that a total amount of combustion of the internal combustion engine has reached a predetermined degree in the second control after combustion of the internal combustion engine is resumed.

7. The internal combustion engine control device according to claim 1, wherein the fuel is directly injected into the combustion chamber of the internal combustion engine.

8. An internal combustion engine control method for controlling an internal combustion engine which is configured to selectively perform a single injection in which fuel is injected into a combustion chamber a single time within an intake stroke, and a split injection in which the fuel is injected into the combustion chamber a plurality of times within the intake stroke, the internal combustion engine control method comprising:

a step of determining whether or not an engine shutoff time, in which-stoppage of combustion of the internal combustion engine occurs, has reached a threshold time period; and a step of performing a first normal control in a case that the combustion of the internal combustion engine is resumed in a state in which the engine shutoff time has not reached the threshold time period, and performing a second control, different from the first control, to suppress generation of soot in a case that the combustion of the internal combustion engine is resumed in a state in which the engine shutoff time has reached the threshold time period;

wherein, in the second control, the split injection or the single injection is carried out within the intake stroke; and a fuel injection timing in the single injection of the second control is delayed with respect to the fuel injection timing in the single injection of the first control.

* * * * *